US005586851A

United States Patent [19]
Haage

[11] Patent Number: 5,586,851
[45] Date of Patent: Dec. 24, 1996

[54] PRESTRESS-MONITORING ELEMENT FOR SCREW-TYPE ANCHORS

[75] Inventor: Manfred Haage, Dornstetten, Germany

[73] Assignee: fischerwerke, Artur Fischer GmbH & Co KG, Waldachtal, Germany

[21] Appl. No.: 445,998

[22] Filed: May 19, 1995

[30] Foreign Application Priority Data

Jun. 23, 1994 [DE] Germany ............... 44 21 959.8

[51] Int. Cl.[6] ................. F16B 31/02; G01L 5/00
[52] U.S. Cl. ................. 411/10; 411/14; 116/212; 116/DIG. 34
[58] Field of Search .................. 411/9–11, 14, 411/916; 116/212, DIG. 34

[56] References Cited

U.S. PATENT DOCUMENTS

| 3,087,371 | 4/1963 | Orner | 411/11 |
| 3,216,303 | 11/1965 | Melzer | 411/11 |
| 3,405,597 | 10/1968 | Elsner et al. | 411/10 |
| 3,948,141 | 4/1976 | Shinjo | 411/10 |

FOREIGN PATENT DOCUMENTS

| 256960 | 10/1963 | Australia | 411/10 |
| 0315501 | 5/1989 | European Pat. Off. . | |
| 2352810 | 4/1975 | Germany . | |
| 2939096 | 4/1981 | Germany . | |
| 4122687 | 5/1993 | Germany . | |
| 4214000 | 7/1993 | Germany . | |
| 251606 | 5/1990 | Japan . | |
| 1808108 | 1/1991 | U.S.S.R. . | |
| 1189031 | 4/1970 | United Kingdom . | |

Primary Examiner—Neill R. Wilson
Attorney, Agent, or Firm—Michael J. Striker

[57] ABSTRACT

A prestress-monitoring element for screw-type anchors is arranged to be inserted like a washer between a nut and an article to be fixed and includes a pressure ring and an expansion ring. If the nut provided for fixing is tightened, then the resultant axial prestress causes the pressure ring to expand the expansion ring until the nut lies against the expansion ring. In this end position, a prestress required by the construction of the prestress-monitoring element is achieved. The position of the nut on the pressure ring can be monitored visually, as a result of which the prestress can be indirectly monitored.

4 Claims, 3 Drawing Sheets

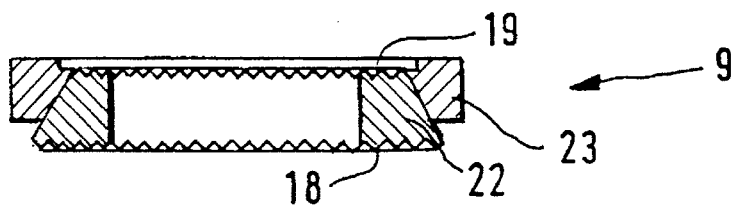
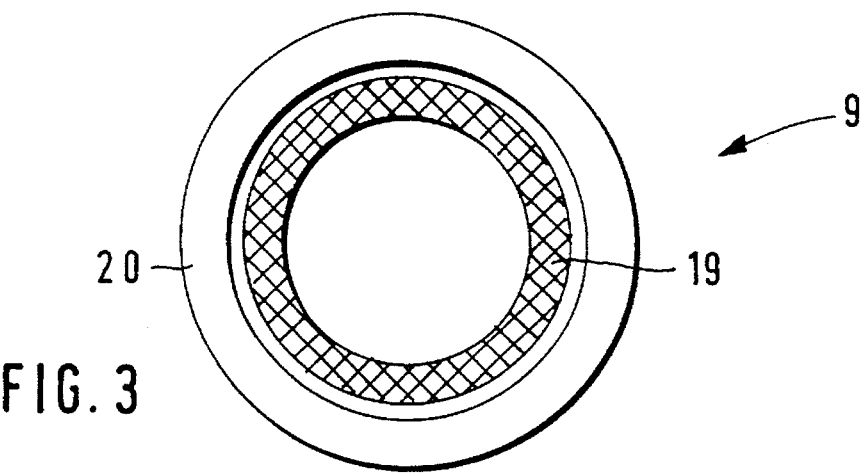
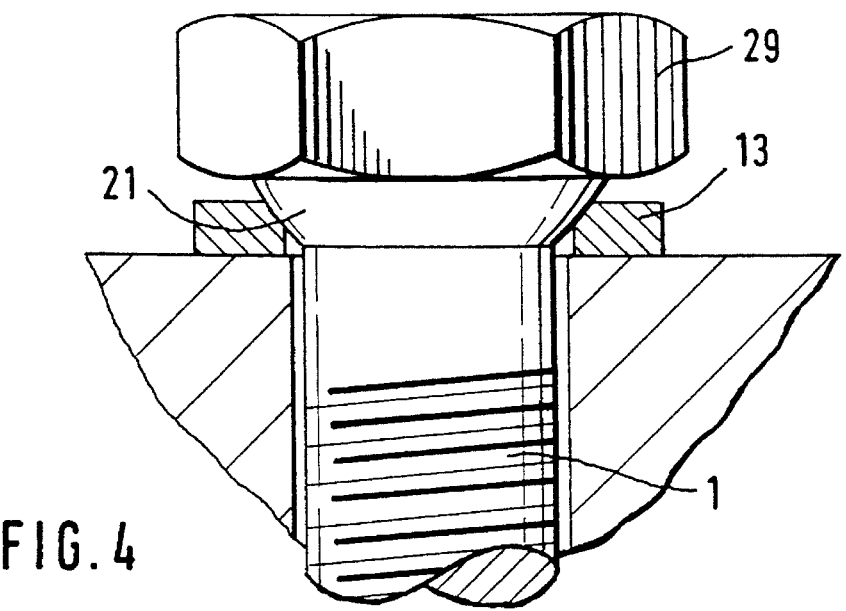

PRESTRESS-MONITORING ELEMENT FOR SCREW-TYPE ANCHORS

BACKGROUND OF THE INVENTION

The present invention relates to a prestress-monitoring element for screw-type anchors.

More particularly, it relates to a prestress-monitoring element which is arranged on an anchoring rod of a screw-type anchor between an article to be fixed to a wall or the like and a screw element of the screw-type anchor.

In screw connections it is always of great importance that the prestress required for reliable fixing is produced by a sufficiently powerful tightening of a screw. Too great a prestress may possibly lead to fracture during mounting, but on the other hand too low a prestress can lead to problems in function and problems of reliability. As a rule, with screw-type mountings it is not the prestress but the tightening torque by means of a torque wrench that is monitored. This has the disadvantage, however, that the torque allows no direct conclusion as to the prestress force, since different parameters exert great influence on the degree of conversion between torque and prestress force. Thus, for example, a greased or co-rotating washer has just as serious effect on the prestress as a dirty washer. With the same tightening torque, it is quite possible for fluctuations in the prestress force of ±50% to occur.

A further problem arises in that in practice the use of torque wrenches is frequently neglected, even though monitoring of the tightening torque is prescribed. This leads to the known disadvantages. In addition, it is not possible to check the conventional screw-type anchors and other types of screw connections subsequently for the presence of the required prestress force in the particular screw connection.

SUMMARY OF THE INVENTION

Accordingly, it is an object of the present invention to provide a prestress monitoring element which in a simple manner allows monitoring of the prestress at least as the screw connection is being tightened.

In keeping with these objects and with others which will become apparent hereinafter, one feature of the present invention resides, briefly stated, in a prestress monitoring element of the above mentioned type, which has a dimensionally stable pressure ring and an expansible expansion ring, at least one of the two contact surfaces between the rings is form of a conical annular surface, a clamping force generated by the screw-type element towards the pressure-monitoring element is used through the bearing surfaces to provide a radial force component expanding the expansion ring, and when the maximum relative axial displacement between the pressure ring and the expansion ring has been achieved in the end position of the screw-type element, the screw-type element lies against both rings.

When the prestress monitoring element is designed in accordance with the present invention, the above outlined problem is solved.

The prestress monitoring element is inserted like a washer beneath the screw head to be tightened, and consists of two cooperating rings, namely, a pressure ring and an expansion ring. As the screw head is tightened, the expansion ring is expanded by the pressure ring using a conical ring surface until the screw head lies against both rings in the end position. In this end position, the torque required to continue turning the screw head suddenly increases. The increase in the moment of resistance can be felt or detected by means of sensors, so that reaching the required prestress can be recognized without difficulty both when tightening the screw head by hand and when using mechanical screw-tightening tools. In addition, a visual check can be carried out as to whether the screw head is lying against both rings and has thus reached its end position in which the required prestress is effective.

By using more or less solid or resilient expansion rings, it is possible to select different levels of the prestress that obtains in the screw connection in the end position of the screw head.

The end face of the ring adjacent to which the screw head lies in its end position can be provided with a frictional face, which serves to increase the friction between ring and screw head. In this manner an especially clearly recognizable increase in the moment of resistance in the end position is obtained.

The pressure ring can bear against the screw head or against the article to be fixed, and can engage with a conically tapering outer surface in the expansion ring and widen this as the screw connection is tightened. The pressure ring can also be formed as an annular collar directly on the anchoring rod of a screw-type anchor, in which case frictional faces for increasing the friction in the end position can preferably be employed on the expansion ring.

The pressure ring can also lie as a ring of trapezoidal cross-section in a correspondingly shaped groove of an expansion ring. Before tightening the screw connection, the expansion ring projects beyond the groove so that it is pressed initially with increasing prestress into the groove and in so doing radially expands the expansion ring until the screw head has reached the end position and lies next to the expansion ring.

The expansion ring consists preferably of a soft, ductile material, whereas the pressure ring can consist of a hard, heat-treated metal. The contact surfaces between the two rings can be provided with an anti-friction coating in order, as the screw connection is being tightened before reaching the end position, to keep the influence of the friction between the rings as low as possible.

A visco-elastic composition which is visibly deformed as the screw head is being tightened may also be provided between the pressure ring and expansion ring. The visible deformation can be effected so that, when the end position has been reached, the visco-elastic composition emerges through a channel on the outside of the prestress monitoring element and provides a visual indication that the end position has been reached.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a prestress monitoring element in which the pressure ring engages from below in the expansion ring;

FIG. 3 is the plan view of the prestress monitoring element of FIG. 2;

FIG. 4 shows an anchoring rod with an expansion ring and an annular collar formed on the rod;

DESCRIPTION OF THE PREFERRED EMBODIMENTS

Figure 1:
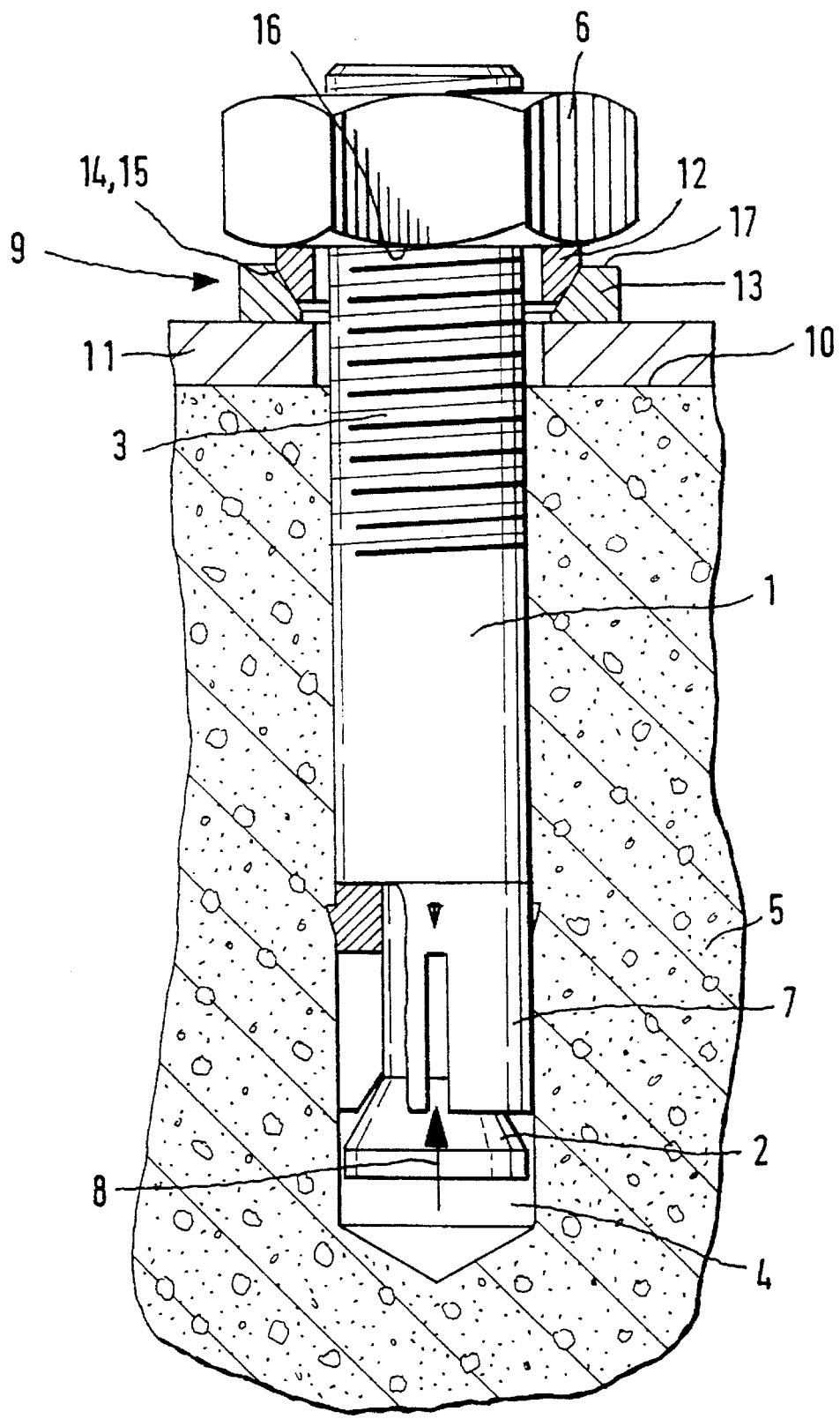
FIG. 1 shows a screw connection in the form of a screw-type anchor with a prestress monitoring element.

A prestress monitoring element in accordance with the present invention is utilized for a screw connection illustrated in FIG. 1 in the form of a screw-type anchor which has an anchoring rod 1 with an expander cone 2 and a threaded portion 3. The screw-type anchor 1 is arranged in a hole 4 drilled in masonry 5. By turning a nut 6 screwed onto the threaded portion 3, the expander cone 2 is drawn in the direction of arrow 8 into an expansible sleeve 7, whereupon the expansible sleeve 7 expands and braces against the wall of the drilled hole 4. As the nut 6 is tightened, it bears against a prestress-monitoring element 9 which is positioned between the nut 6 and an article 11 to be fixed to the wall surface 10.

The prestress-monitoring element 9 in accordance with the present invention has an inner pressure ring 12 and an outer expansion ring 13. Both rings 12, 13 touch one another at conical annular faces 14, 15.

When the screw 6 is tightened, the pressure ring 12 is pressed into the expansion ring 13, whereupon a radial force component is introduced through the conical annular faces 14, 15 into the expansion ring 13. As the prestress increases, the expansion ring 13 continues to expand until the nut 6 abuts with its underside 16 against the end face 17 of the expansion ring 13. Once the nut 6 abuts against the expansion ring 13, the end position has been reached with the required prestress.

In FIG. 1, a nut 6 is illustrated as the screw-type element. The screw-type anchor could, however, also be constructed so that the anchoring rod 2 forms a one-piece part together with a screw head 18, as illustrated in FIG. 4. In that case, the expander cone 2 would have to be joined by way of a threaded rod to the anchoring rod 1, as is described and illustrated, for example, in DE 23 52 810 A1.

The prestress-monitoring element illustrated in FIG. 2 has a pressure ring 22 with two end faces 18, 19 constructed as frictional faces. If the prestress-monitoring element is used in a screw-type anchor as in FIG. 1, then the end face 18 lies on the article 11. The end face 19 comes into contact with the nut 6 as soon as the nut 6 has reached the end position in the clamped state. Since the end face 19 is in the form of a frictional face, when in contact with this frictional face the nut 6 can continue to be turned only with a markedly higher torque. This means that contact with the end face 19, and therefore reaching of the end position, is clearly noticeable. By looking at the prestress-monitoring element from the side, reaching of the end position can also be monitored visually without difficulty.

The end faces 19, 20 of the two rings 23, 23, are visible in the plan view of FIG. 3.

In the embodiment illustrated in FIG. 4, the pressure ring is in the form of an annular collar 21 formed on the anchoring rod 1. The expansion ring 13 corresponds to the expansion ring illustrated in FIG. 1. The anchoring 1 has a screw head 18 which, like the nut 6 of FIG. 1, in the clamped state when the end position has been reached against the expansion ring 13.

Figure 5:
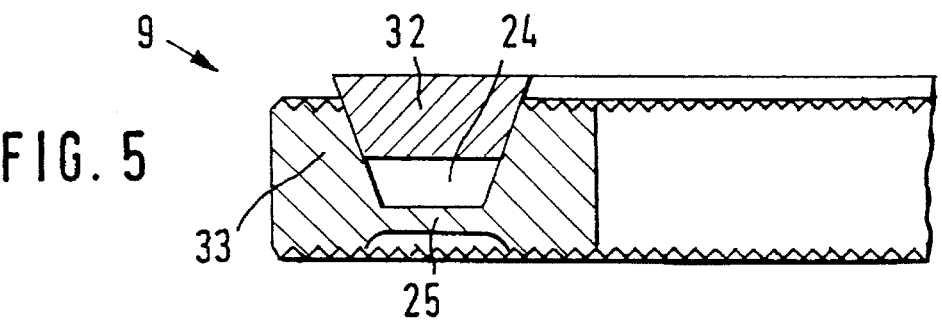
FIG. 5 shows a half-section through an annular prestress-monitoring element, in which the pressure ring has a trapezoidal cross-section.

The half-section presented in FIG. 5 shows a pressure ring 32 of trapezoidal cross-section, which engages in a V-shaped groove 24 in an expansible expansion ring 33. The base of the groove 24 is formed by a narrow expansion zone 25.

Figure 6:
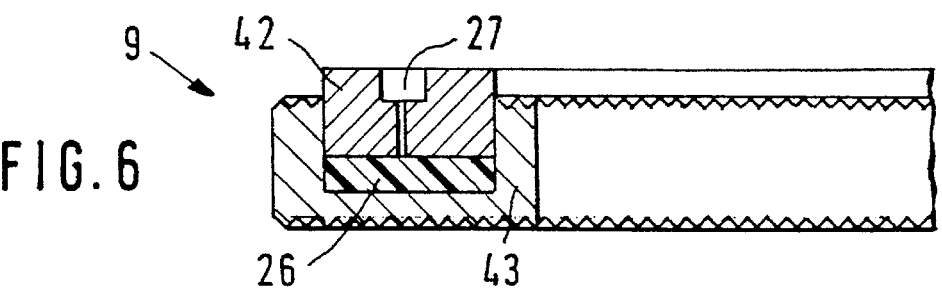
FIG. 6 shows a half-section of a prestress-monitoring element in which a visco-elastic composition is embedded between the pressure ring and the expansion ring.

FIG. 6 illustrates an embodiment in which a visco-elastic composition 26 is provided between the pressure ring 42 and the expansion ring 43. On tightening of the screw element and on associated bearing down of the pressure ring 42, the visco-elastic composition is able to emerge through a channel 27 on the outside of the prestress-monitoring device 9.

Figure 7:
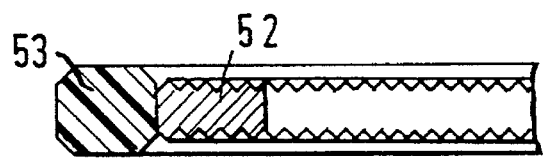
FIG. 7 is a half-section of a prestress-monitoring element with an outer expansion ring of deformable material.

The construction illustrated in FIG. 7 has a deformable expansion ring 53 which encircles the pressure ring 52 externally.

Figure 8:
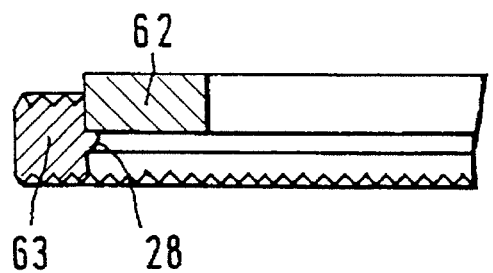
FIG. 8 is a half-section of a prestress-monitoring element in which the pressure ring lies on a shear collar.

In FIG. 8, the pressure ring 62 lies on a shear collar 28 of an outer ring 63. As soon as adequate prestress is acting by way of the pressure ring 62 on the shear collar 28, this shears off.

In all embodiments, the contact surfaces between the two rings of the prestress-monitoring elements can be provided with an anti-friction coating.

It will be understood that each of the elements described above, or two or more together, may also find a useful application in other types of constructions differing from the types described above.

While the invention has been illustrated and described as embodied in a prestress-monitoring element for screw-type anchors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A prestress-monitoring element for a screw-type anchor to be arranged on an anchoring rod of the screw-type anchor between an article to be fixed to a wall and the screw element of the screw-type anchor, the prestress-monitoring element comprising a dimensionally stable pressure ring and an expansible expansion ring having contact surfaces therebetween, said contact surfaces between said rings including at least one contact surface which is formed as a conical annular surface, said rings being formed so that under the action of a clamping force generated by the screw-type element toward the prestress-monitoring element, by way of bearing surfaces, a radial force component expands said expansion ring, and in an end position of the screw-type element when a maximum relative axial displacement between said pressure ring and said expansion ring has been achieved, the screw-type element abuts against both rings, said expansion ring having an end face provided with a circumferential groove, said pressure ring having a trapezoidal cross-section and engaging in said circumferential groove so that said expansion ring expands radially outward into said groove as said pressure ring presses in.

2. A prestress-monitoring element as defined in claim 1, wherein one of said rings has an end face formed as a frictional face against which the screw-type element abuts in the end position.

3. A prestress-monitoring element for a screw-type anchor to be arranged on an anchoring rod of the screw-type anchor between an article to be fixed to a wall and the screw element of the screw-type anchor, the prestress-monitoring element comprising a dimensionally stable pressure ring and an expansible expansion ring having contact surfaces therebetween, said contact surfaces between said rings including at least one contact surface which is formed as a conical annular surface, said rings being formed so that under the action of a clamping force generated by the screw-type element toward the prestress-monitoring element, by way of bearing surfaces, a radial force component expands said expansion ring, and in an end position of the screw-type element when a maximum relative axial displacement between said pressure ring and said expansion ring has been achieved, the screw-type element abuts against both rings; and an anti-friction coating applied on said contact surfaces of said rings.

4. A prestress-monitoring element for a screw-type anchor to be arranged on an anchoring rod of the screw-type anchor between an article to be fixed to a wall and the screw element of the screw-type anchor, the prestress-monitoring element comprising a dimensionally stable pressure ring and an expansible expansion ring having contact surfaces therebetween, said contact surfaces between said rings including at least one contact surface which is formed as a conical annular surface, said rings being formed so that under the action of a clamping force generated by the screw-type element toward the prestress-monitoring element, by way of bearing surfaces, a radial force component expands said expansion ring, and in an end position of the screw-type element when a maximum relative axial displacement between said pressure ring and said expansion ring has been achieved, the screw-type element abuts against both rings and a visco-elastic composition provided between said pressure ring and said expansion ring and being visibly deformable when the screw element is tightened.

* * * * *